United States Patent [19]
Anderson

[11] Patent Number: 5,640,477
[45] Date of Patent: Jun. 17, 1997

[54] ELECTRO-OPTICAL COMPONENT ALIGNMENT TECHNIQUE

[75] Inventor: William W. Anderson, Half Moon Bay, Calif.

[73] Assignee: Lockheed Missiles & Space Company, Inc., Sunnyvale, Calif.

[21] Appl. No.: 573,731

[22] Filed: Dec. 18, 1995

[51] Int. Cl.$^6$ ............................................. G02B 6/42
[52] U.S. Cl. .................................. 385/89; 385/88
[58] Field of Search ............................ 385/88–94, 147

[56] References Cited

U.S. PATENT DOCUMENTS

| | | | |
|---|---|---|---|
| 4,787,696 | 11/1988 | Norris et al. | 385/89 |
| 5,361,382 | 11/1994 | Nakamura et al. | 385/147 X |
| 5,420,953 | 5/1995 | Boudreau et al. | 385/89 X |

OTHER PUBLICATIONS

C.A. Armiento, et al., "Gigabit Transmitter Array Modules on Silicon Waferboard," *IEEE Transactions on Components, Hybrids, and Manufacturing Technology*, Dec. 1992, vol. 15, No. 6, pp. 1072–1079, U.S.A.

M.F. Grant, et al., "Low–loss coupling of ribbon fibres to silica–on–silicon integrated optics using preferentially etched V–grooves," *Integrated Photonics Research*, 1991, pp. 166–167, Canada. No month.

M.F. Grant, et al., "Self–Aligned Multiple Fibre Coupling for Silica–On–Silicon Integrated Optics," *Proceedings of the 9th Annual EFOC/LAN Conference*, Jun. 19–21, 1991, pp. 269–272, London, England.

D. Leclerc, et al., "High–Performance Semiconductor Optical Amplifier Array for Self–Aligned Packaging Using Si V–Groove Flip–Chip Technique," *IEEE Photonics Technology Letters*, May 1995, vol. 7, No. 5, pp. 476–478, U.S.A.

D. Marcuse, "Loss Analysis of Single–Mode Fiber Splices," *The Bell System Technical Journal*, May–Jun. 1977, vol. 56, No. 5, pp. 703–718, U.S.A.

M. Mehregany, et al., "Anisotropic Etching of Silicon in Hydrazine," *Sensors and Actuators*, 1988, pp. 375–390, U.S.A.

C.M. Miller, "Mechanical Optical Fiber Splices," *Journal of Lightwave Technology*, Aug. 1986, vol. LT–4, No. 8, pp. 1228–1231, U.S.A.

E.J. Murphy, et al., "Permanent Attachment of Single–Mode Fiber Arrays to Waveguides," *Journal of Lightwave Technology*, Aug. 1985, vol. LT–3, No. 4, pp. 795–798, U.S.A.

C.M. Schroeder, "Accurate Silicon Spacer Chips for an Optical–Fiber Cable Connector," *The Bell System Technical Journal*, Jan. 1978, vol. 57, No. 1, pp. 91–97, U.S.A.

J.I. Thackara, et al., "Poled electro–optic waveguide formation in thin–film organic media," *Appl. Phys. Lett.*, 28 Mar. 1988, vol. 52, No. 13, pp. 1031–1033, U.S.A.

*Primary Examiner*—Phan T. H. Palmer
*Attorney, Agent, or Firm*—Fenwick & West LLP

[57] ABSTRACT

A method for aligning optical fibers (20) with leads (21) from electro-optical components (2). The method comprises the steps of completely severing a single crystallographic substrate (15) into discrete first (3) and second (5 or 7) pieces; on the first piece (3), fabricating at least one electro-optical component (2) having an elongated lead (21); on the second piece (5 or 7) fabricating at least one elongated groove (6) adapted to hold an optical fiber (20); and abutting the first (3) and second (5 or 7) piece against each other on a flat surface (17) so that each lead (21) abuts a groove (6). A film layer (18), e.g., comprising a thin-film polymer, may be placed on top surface (4) of crystallographic substrate (15). The electro-optical component (2) may be an array of electro-optical components comprising one or more integrated electro-optical components. At least one alignment channel (11) is formed in the upper surface (4) of the substrate (15). The alignment channel (11) traverses the first piece (3) and the second piece (5 or 7). A rod or pin (12) is placed in each alignment channel (11) to provide for lateral alignment.

14 Claims, 4 Drawing Sheets

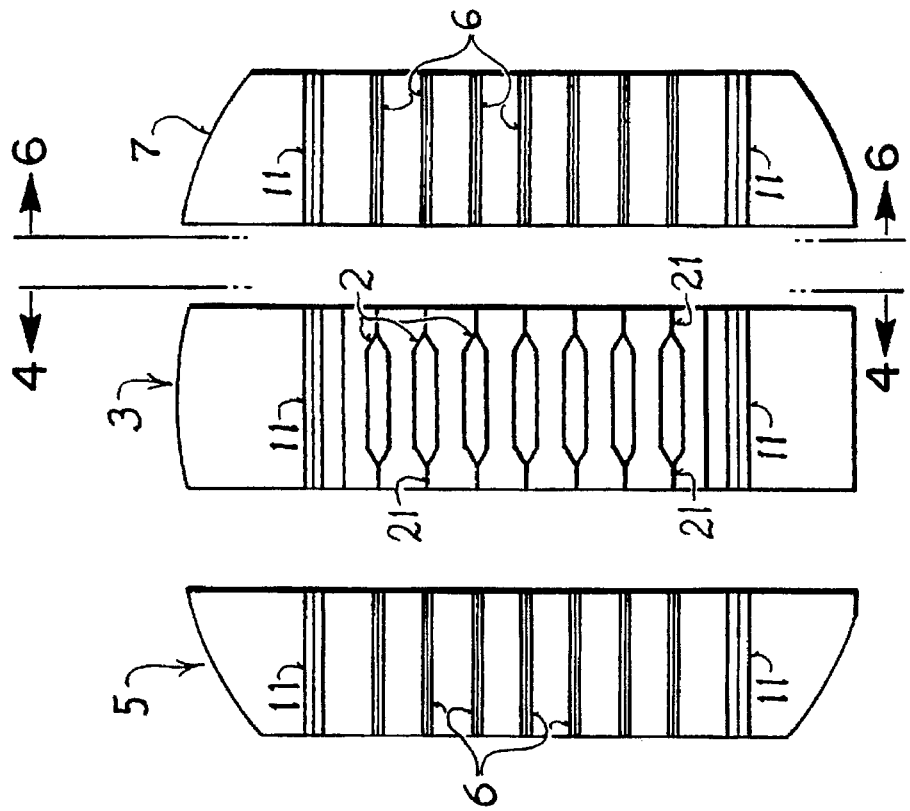
FIG_1
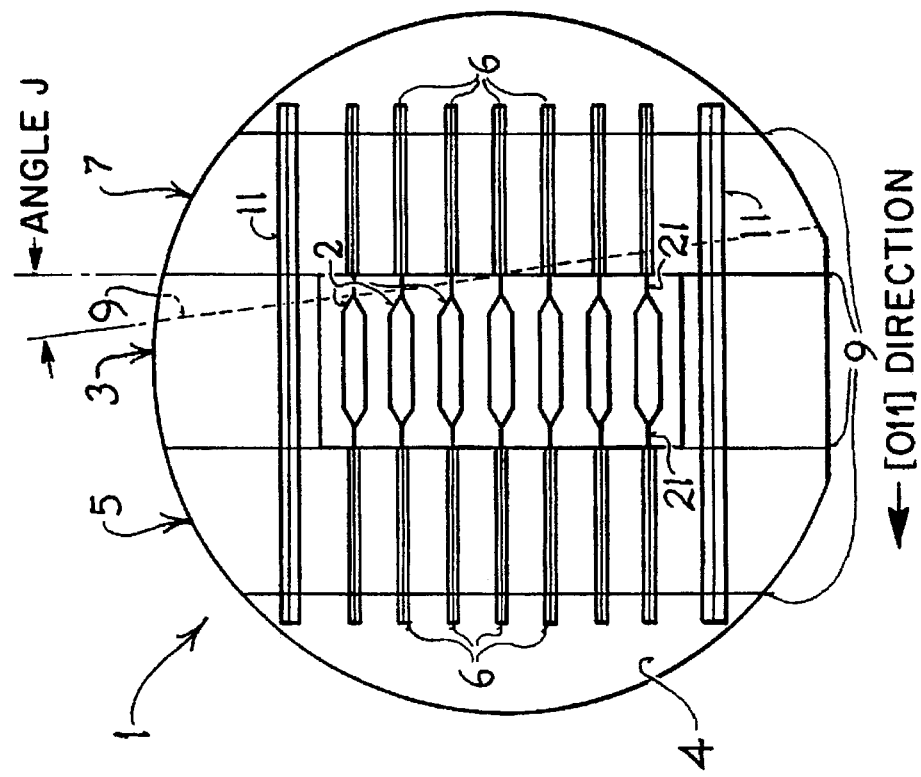
FIG_2

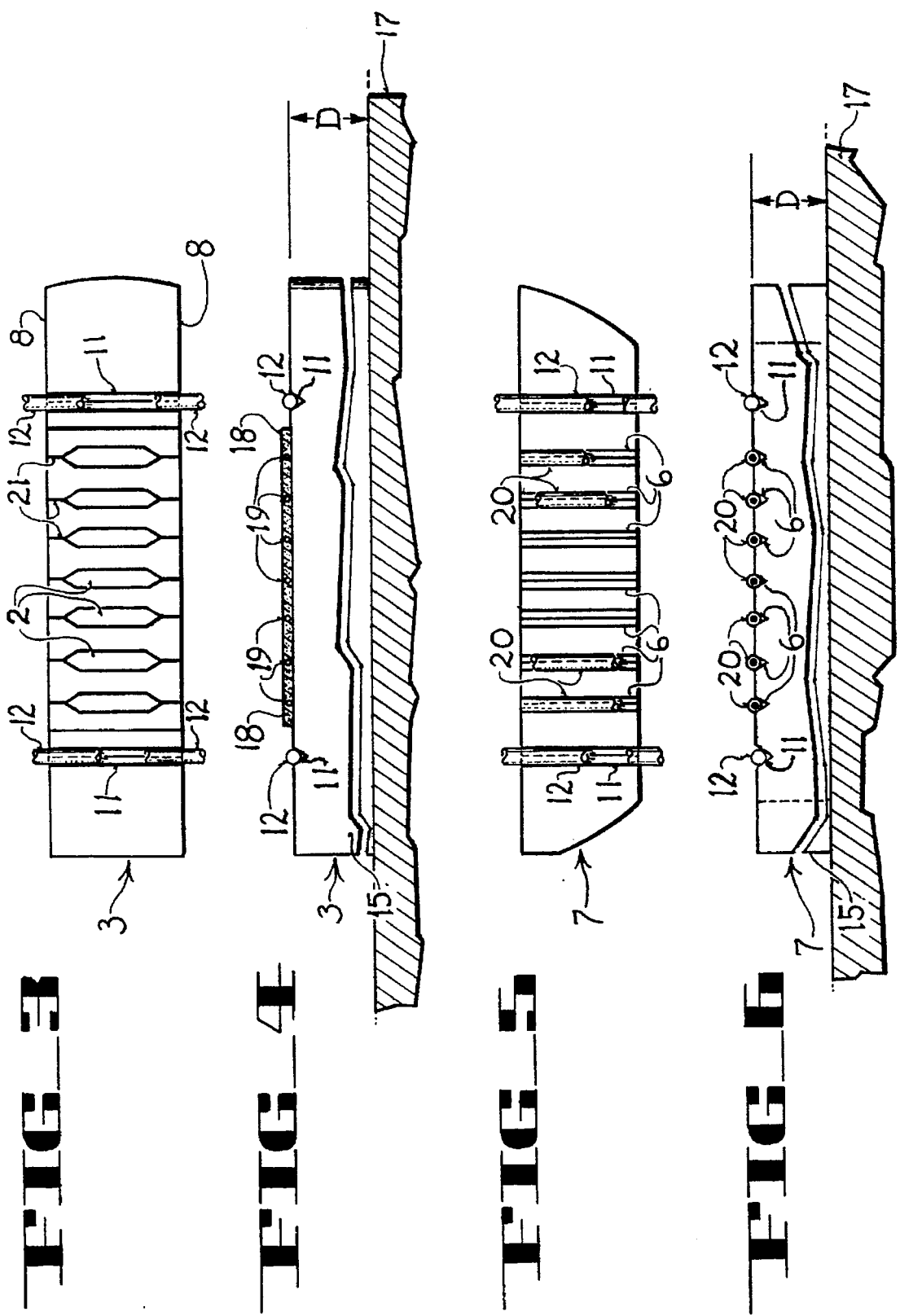

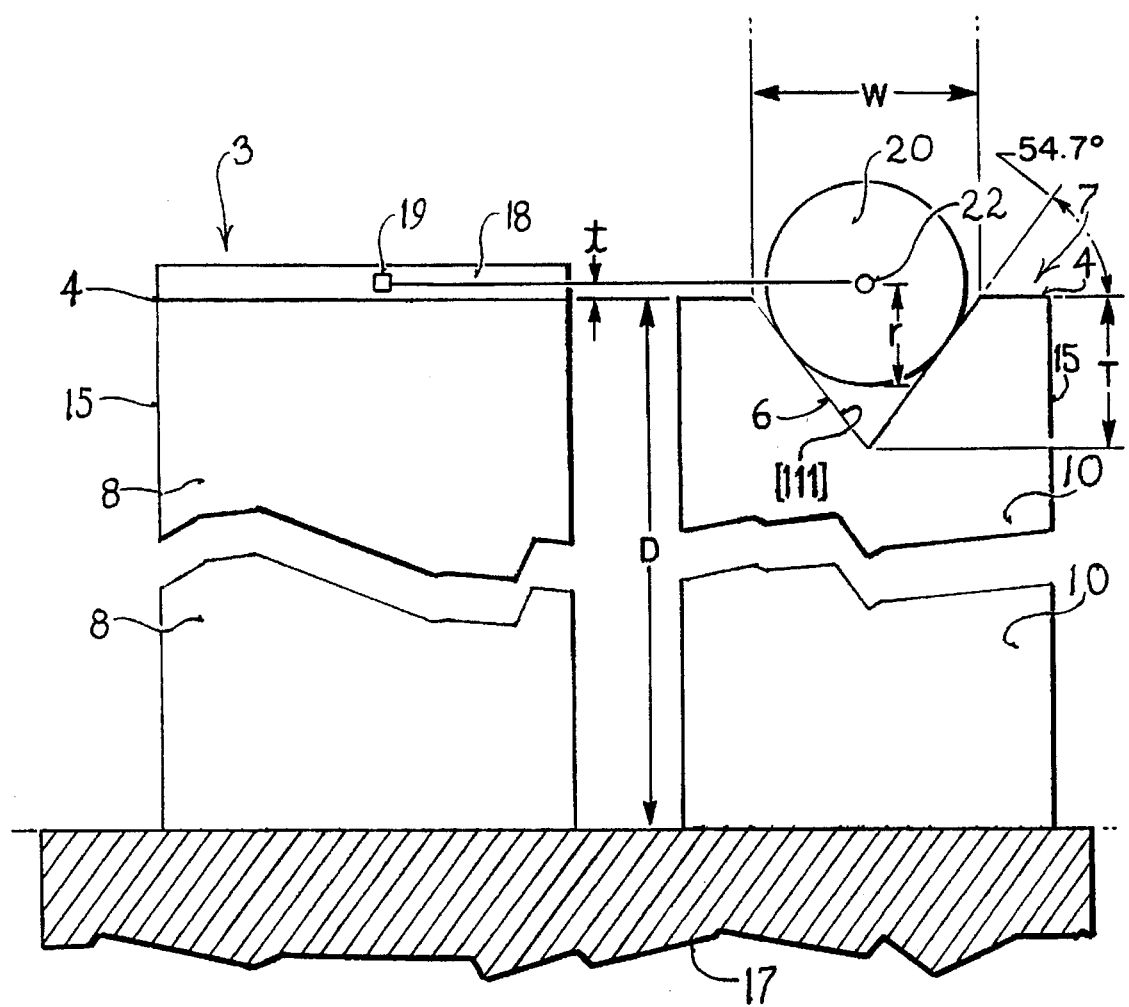
FIG_7

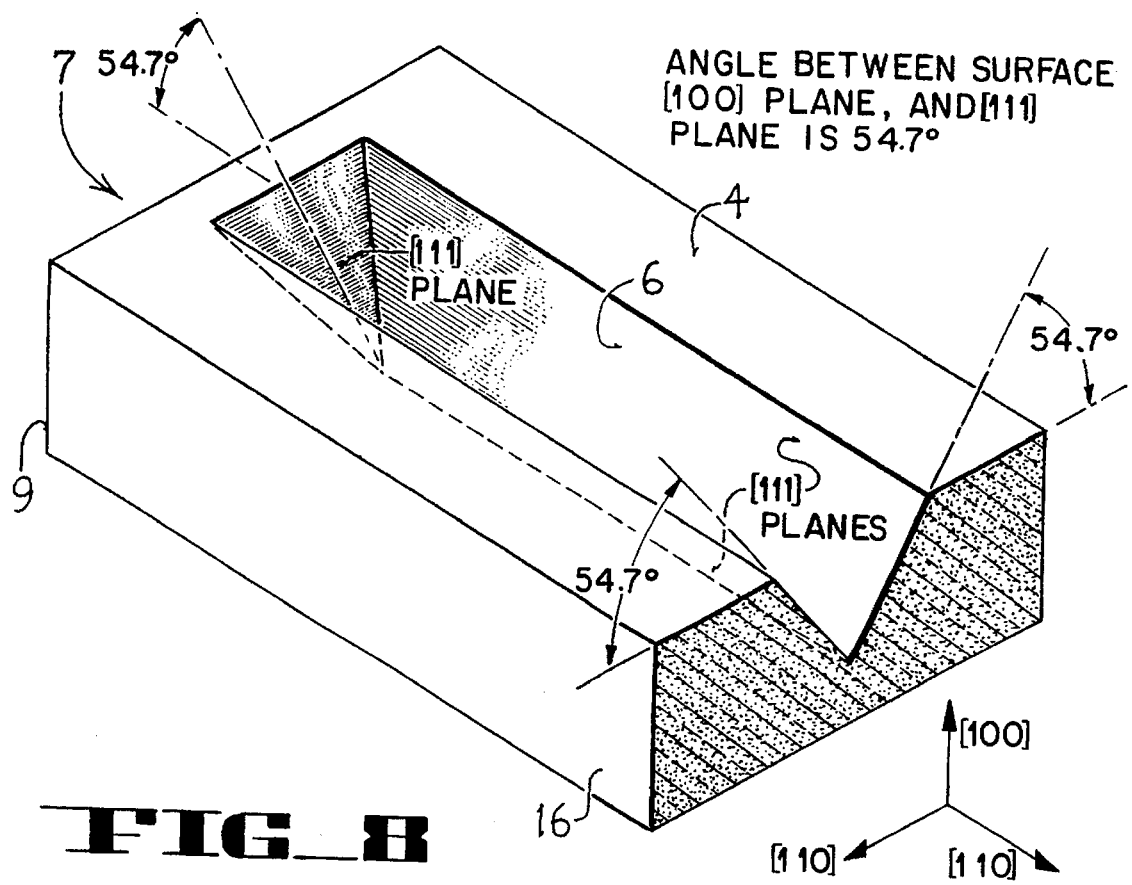
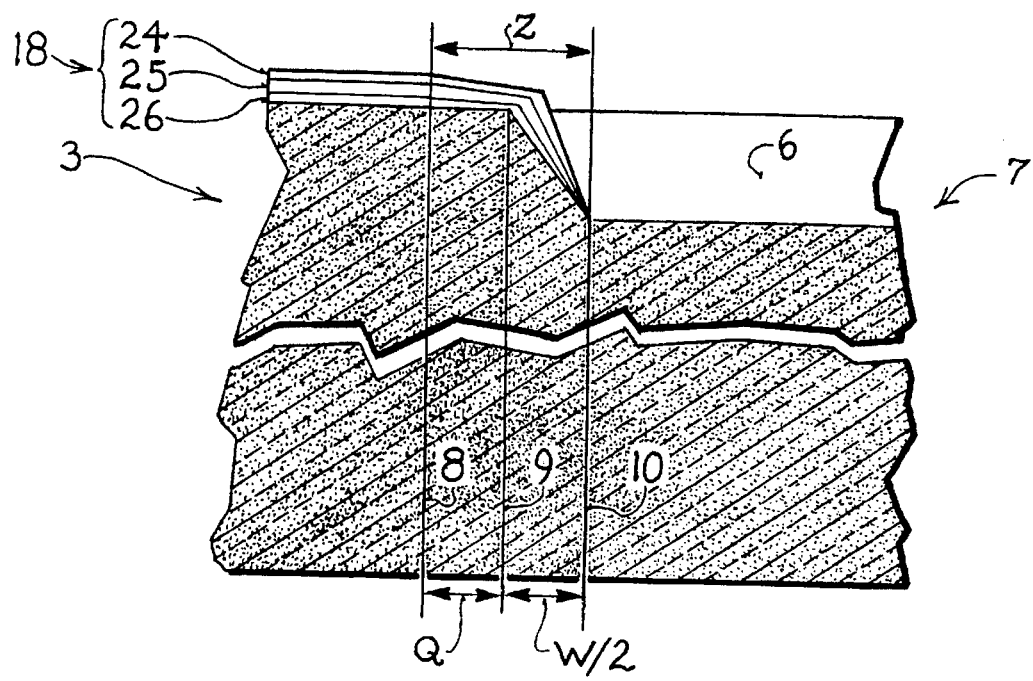

ELECTRO-OPTICAL COMPONENT
ALIGNMENT TECHNIQUE

TECHNICAL FIELD

This invention pertains to the field of aligning optical fibers with leads from electro-optical components.

BACKGROUND ART

C. A. Armiento, et al., "Gigabit Transmitter Section Modules on Silicon Waferboard," *IEEE Transactions on Components, Hybrids, and Manufacturing Technology*, December 1992, Vol. 15, No. 6, pp. 1072–1079, U.S.A.

M. F. Grant, et al., "Low-loss coupling of ribbon fibres to silica-on-silicon integrated optics using preferentially etched V-grooves." *Integrated Photonics Research*, 1991, pp. 166–167, Canada.

M. F. Grant, et al., "Self-Aligned Multiple Fibre Coupling for Silica-On-Silicon Integrated Optics," *Proceedings of the 9th Annual EFOC/LAN Conference*, Jun. 19–21, 1991, pp. 269–272, London, England.

D. Leclerc, et al., "High-Performance Semiconductor Optical Amplifier Section for Self-Aligned Packaging Using Si V-Groove Flip-Chip Technique," *IEEE Photonics Technology Letters*, May 1995, Vol. 7, No. 5, pp. 476–478, U.S.A.

D. Marcuse, "Loss Analysis of Single-Mode Fiber Splices," *The Bell System Technical Journal*, May–June 1977, Vol. 56, No. 5, pp. 703–718, U.S.A.

M. Mehregany, et al., "Anisotropic Etching of Silicon in Hydrazine," *Sensors and Actuators*, 1988, pp. 375–390, U.S.A.

C. M. Miller, "Mechanical Optical Fiber Splices," *Journal of Lightwave Technology*, August 1986, Vol. LT-4, No. 8, pp. 1228–1231, U.S.A.

E. J. Murphy, et al., "Permanent Attachment of Single-Mode Fiber Sections to Waveguides," *Journal of Lightwave Technology*, August 1985, Vol. LT-3, No. 4, pp. 795–798, U.S.A.

C. M. Schroeder, "Accurate Silicon Spacer Chips for an Optical-Fiber Cable Connector," *The Bell System Technical Journal*, January 1978, Vol. 57, No. 1, pp. 91–97, U.S.A.

J. I. Thackara, et al., "Poled electro-optic waveguide formation in thin-film organic media," *Appl. Phys. Lett.*, 28 Mar. 1988, Vol. 52, No. 13, pp. 1031–1033, U.S.A.

DISCLOSURE OF INVENTION

The present invention describes a method for aligning optical fibers (20) with leads (21) from electro-optical components (2). The method comprises the step of completely severing a single crystallographic substrate (15) into discrete first (3) and second (5 or 7) pieces. On the first piece (3), at least one electro-optical component (2) having an elongated lead (21) is fabricated. On the second piece (5 or 7), at least one elongated groove (6) adapted to hold an optical fiber (20) is fabricated. The first (3) and second (5 or 7) pieces are abutted against each other on a flat surface (17) so that each lead (21) abuts a groove (6).

BRIEF DESCRIPTION OF THE DRAWINGS

These and other more detailed and specific objects and features of the present invention are more fully disclosed in the following specification, reference being had to the accompanying drawings, in which:

FIG. 1 is a top planar view of an aligned assembly 1 comprising grooves 6 aligned with leads 21 from electro-optical components 2, and common alignment grooves 11 across the assembly 1.

FIG. 2 depicts the aligned assembly 1 of FIG. 1 separated into discrete pieces 5, 3, 7.

FIG. 3 depicts component section 3 of FIG. 1.

FIG. 4 is a side view of component section 3 taken along view lines 4—4 in FIG. 2.

FIG. 5 depicts the right alignment bench 7 of FIG. 1.

FIG. 6 is a side view of right alignment bench 7 taken along view lines 6—6 in FIG. 2.

FIG. 7 is a side view of component section 3 and alignment bench 7 prior to alignment.

FIG. 8 is a perspective view of alignment bench 7 showing the details of an individual groove 6.

FIG. 9 is a cross-sectional side view of component section 3 and alignment bench 7 prior to diceing along street 9.

DETAILED DESCRIPTION OF THE
PREFERRED EMBODIMENTS

The mechanical alignment of an optical fiber section to another optical fiber section by embedding individual optical fiber sections in micro-machined silicon chip connectors has been described in Miller, supra. The silicon chip connectors are fabricated by anisotropic etching of single-crystal silicon wafers through a photolithographically defined mask. Schroeder, supra. However, the attachment of optical fibers 20 to electro-optical components 2 (such as integrated optic components, lasers, waveguides, modulators, detectors, splitters, couplers, combiners, switches, etc.) presents a difficult problem, because, for example, lateral positioning to sub-micrometer accuracy and angular positioning in all planes to sub-degree accuracy is required to reduce coupling losses to less than 1 dB (a requirement for many applications). Marcus,, supra. Also, the etching associated with the formation of grooves 6 for the optical fibers 20 may contaminate the steps of fabricating the electro-optical components 2. As a result, the alignment of a section of optical fibers 20 to a section of electro-optical components 2 currently requires an active alignment technique, in which the throughputs of at least two of the fiber-component connections are simultaneously maximized. Murphy, supra. Such an active alignment process is time-consuming and costly.

The present invention overcomes the above problems by means of providing a method for the automatic passive mechanical alignment of optical fibers 20 to electro-optical components 2, both vertically and laterally.

FIG. 1 depicts an aligned assembly 1 of optical fiber grooves 6 aligned with leads 21 from electro-optical components 2. These components 2 may comprise one or more integrated optic components, lasers, waveguides, modulators, detectors, splitters, couplers, combiners, switches, etc. Components 2 are positioned on component section 3. Grooves 6 are positioned on left alignment bench 5 and right alignment bench 7, respectively. Upper and lower alignment channels 11 are used for lateral alignment. Channels 11 traverse both benches 5, 7 and component section 3. Channels 11 are formed prior to diceing of the assembly 1, so that the various pieces 3, 5, 7 can be aligned laterally subsequent to diceing. Dice streets 9 indicate the directions in which the transverse dices (cuts) are made. The dices are made generally orthogonal to the upper (100) surface 4 of (single-crystal) silicon substrate 15. A single substrate 15 is common to all sections 3, 5, 7. The solid streets 9 illustrated in FIG. 1 may be perpendicular to grooves 6 or at a small (say 7 degrees) angle to the perpendicular to grooves 6. Dashed street 9 makes an angle J with respect to the solid streets 9. The reason for making a dice at such an angle J is to avoid reflected light and concomitant feedback, which might impair the functioning of the electro-optical components 2. For both the solid streets 9 and the dashed street 9, the dice plane is usually but not necessarily orthogonal to the plane of surface 4.

FIG. 2 illustrates the assembly 1 of FIG. 1 separated into three discrete pieces 5, 3, 7 by means of diceing. This illustrates a step in the method of the present invention that is more fully discussed below.

FIGS. 4 and 6 illustrate alignment pins or rods 12 positioned in alignment channels 11, thereby achieving lateral alignment between component section 3 and right alignment bench 7. Pins 12 are typically fabricated of glass or stainless steel.

Although the Figures illustrate alignment between items 3 and 7, the techniques illustrated herein are equally applicable to alignment between component section 3 and left alignment bench 5.

FIG. 4 illustrates one example of component section 3 comprising a polymer layer 18 having core regions 19 where light may be most readily transmitted. Polymer layer 18 is typically a thin-film (i.e., less than 10 micrometer) layer. FIG. 6 illustrates optical fibers 20 positioned within grooves 6. FIGS. 4 and 6 illustrate that component section 3 and alignment bench 7 are resting on an extremely flat surface 17, e.g., an optically flat surface. FIGS. 4 and 6 are not drawn to scale in that the height D of substrate 15 has been artificially shortened in these Figures.

FIG. 7 illustrates an example of component section 3 comprising an electro-optically active polymer waveguide device consisting of a polymer layer 18 and a waveguide core 19. Core 19 must be positioned with submicrometer accuracy to core 22 of optical fiber 20 in order to achieve efficient coupling. Marcuse, supra. The square cross-section of core 19 is illustrative only; other cross-sections are common. FIG. 7 depicts polished component section end face 8 of component section 3 and polished alignment bench end face 10 of alignment bench 7. Faces 8 and 10 are end faces of substrate 15, typically a silicon substrate available to SEMI standards with a thickness tolerance of plus or minus 20 micrometers and a total thickness variation across the wafer of 10 micrometers. Thus, the positions of cores 19, 22 are fully defined with respect to the bottom of substrate 15. However, the thicknesses of the core 19 and polymer 18 (and any metal layers which are present) are controlled to submicrometer dimensions during deposition and processing, so that the core 19 position above the top substrate surface 4 is known and controlled to submicrometer accuracy. The approach to mechanical alignment in this invention is thus based on referencing everything to the top substrate surface 4.

Typical dimensions are as follows:

D=525 micrometers±20 micrometers
r=(t+T)sin35.3°
T=r/sin35.3°−t
W=2Ttan35.3° where

D is the vertical distance from surface 4 to surface 17;

r is the radius of the circular cross-section of optical fiber 20;

t is the vertical distance from the center of each of cores 19 and 22 to surface 4;

T is the vertical distance from surface 4 to the bottom of groove 6; and

W is the width of groove 6.

If t=3 micrometers and r=62.5 micrometers, then W=149 micrometers and T=105 micrometers.

Metal contact layers (not illustrated in FIG. 7) may be present above and below polymer layer 18. When present, these metal layers are typically between 0.5 micrometer and 3 micrometers thick. When a lower metal layer is used, it is formed (e.g., by a physical vapor deposition process) on substrate 15 before the formation of polymer layer 18. Said metal layer is insensitive to surface 4 discontinuities.

Polymer layer 18 can be thought of as having three layers (illustrated as layers 24, 25 and 26 in FIG. 9), representing a top clad 24 approximately three micrometers thick, a core region 25 approximately three micrometers thick, and a bottom clad 26 approximately three micrometers thick, respectively.

V-shaped grooves 6 and alignment channels 11 are typically etched in benches 5 and 7 in [110] directions of (100) oriented silicon wafers 15 by an anisotropic etchant such as KOH, hydrazine, or ethylenediamine-pyrocatechol-water. Mehregany, supra. The primary flat surface on (100) silicon wafer 15 is in a [110] direction. Therefore, alignment channels 11 and grooves 6 are generally parallel to the primary wafer flat. The alignment channels 11 are fabricated by the same techniques as grooves 6, and are large enough to accommodate mechanically robust pins 12. The optical fiber grooves 6 are dimensioned to position optical fibers 20 at the desired height as shown in FIG. 7. Since the total thickness variation across a prime-grade wafer 15 is a maximum of 10 micrometers, the thickness D for both component section 3 and alignment bench 7 varies significantly less than 1 micrometer, even when kerf loss of width Z is taken into account (see FIG. 9).

FIG. 8 illustrates in more detail the geometry of groove 6. It is seen that the angle between each side of the V (the [111] plane) and upper surface 4 is 54.7 degrees. FIG. 8 also illustrates that the left end of groove 6 does not extend all the way to dice street 9, and that said end terminates in a plane that is at an angle with respect to the vertical.

In one embodiment of the present invention, the fabrication sequence is as follows:

Embodiment I:

1. The grooves 6 are masked and etched using an oxide mask on a silicon substrate 15 that has not yet been diced.

2. The oxide mask is removed, and some or all of component section 3 is fabricated, possibly entailing the use of optional polymer layer 18.

3. The wafer 15 is diced completely through, along perpendicular [110] streets 9, forming discrete and separate pieces: component section 3 and alignment bench 7.

4. Any polymer 18 is removed from the left-most end of alignment bench 7 (see FIG. 9), and said end is polished back to end face 10. To the right of end face 10, groove 6 is at full depth.

5. The right-most end of component section 3 (see FIG. 9) is polished back to end face 8. To the left of end face 8, layer 18 has uniform thickness.

6. The optical fibers 20 are assembled in their grooves 6.

7. Component section 3 and alignment bench 7 are abutted together so that their respective substrates 15 each rest on an extremely flat surface 17, e.g., an optically flat surface.

There is a good deal of flexibility in the order in which the above steps can be performed. For example, steps 1 and 2 can be performed after, rather than before, diceing.

Furthermore, several of the above steps are optional. For example, steps 4 and 5 can be eliminated if a high-quality diamond saw is employed in the diceing step, i.e., a saw with a fine enough grit. Thus, in a second embodiment of the present invention, just four steps are performed, in the following order:

Embodiment II:

1. A single crystallographic substrate 15 is diced, forming two completely separate and discrete pieces: component section 3 and alignment bench 7.

2. At least one electro-optical component 2 having an elongated lead 21 is fabricated on component section 3.

3. At least one elongated groove 6 adapted to hold an optical fiber 20 is fabricated on alignment bench 7.

4. Component section 3 and alignment bench 7 are abutted against each other on flat surface 17, so that each lead 21 abuts a groove 6.

The fabrication of electro-optical component 2 may or may not employ the use of polymer 18. When a polymer layer 18 is employed, it is typically formed on upper surface 4 of wafer 15 by means of spinning the wafer 15 while the polymer 18 is formed thereon. This helps to insure a uniform thickness for polymer 18, but results in a tapering off of the thickness of said layer 18 along the outer edges thereof, as illustrated in FIG. 9. FIG. 9 illustrates an embodiment of the present invention in which grooves 6 are formed before the formation of polymer layer 18 (comprising sublayers 24, 25 and 26). If present, said outer edges of polymer layer 18 are removed, as indicated in steps 4 and 5 of Embodiment I. The amount of substrate 15 removed from alignment bench 7 is W/2 wide, where W is the groove 6 width required for vertical alignment of the optical fibers 20. The amount of substrate 15 removed from component section 3 is Q wide, where Q, the distorted polymer spin-thickness region, is determined by polymer viscosity and surface tension at the step edge during spinning. W/2+Q=Z, the total kerf loss width. Z is typically about 200 micrometers.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A method for aligning optical fibers with leads from electro-optical components, said method comprising the steps of:

completely severing a single crystallographic substrate into discrete first and second pieces;

on the first piece, fabricating at least one electro-optical component having an elongated lead;

on the second piece, fabricating at least one elongated groove adapted to hold an optical fiber; and abutting the first and second pieces against each other on a flat surface so that each lead abuts a groove.

2. The method of claim 1, further comprising the step of forming at least one film layer on the surface of the crystallographic substrate.

3. The method of claim 2, wherein the film layer is a thin-film polymer layer.

4. The method of claim 1, wherein the substrate comprises silicon.

5. The method of claim 1, wherein the at least one electro-optical component comprises an array of electro-optical components.

6. The method of claim 1, wherein the at least one electro-optical component comprises at least one integrated electro-optical component.

7. The method of claim 5 or claim 6, wherein the at least one elongated groove comprises a plurality of generally parallel grooves.

8. The method of claim 1, wherein the at least one groove is aligned along the direction of the substrate.

9. The method of claim 1, wherein the severing is performed in a plane that makes an angle with respect to each plane that is perpendicular to the at least one groove.

10. The method of claim 1, wherein the severing is performed in a plane that is perpendicular to the at least one groove.

11. The method of claim 1, further comprising the step of making at least one alignment channel in an upper surface of said substrate, each alignment channel traversing the first piece and the second piece, so that each alignment channel has a first piece portion and a second piece portion.

12. The method of claim 11, wherein the step of making at least one alignment channel is performed prior to the severing step.

13. The method of claim 11, wherein the step of making at least one alignment channel is performed subsequent to the severing step.

14. The method of claim 11, further comprising the step of placing an elongated rod in the first piece portion and the second piece portion of each alignment channel, thereby causing lateral alignment between the first piece and the second piece.

* * * * *